Feb. 1, 1955 R. KURZWEIL 2,701,042
CLUTCH FOR A POWER TRANSMISSION MECHANISM
Filed May 15, 1948 2 Sheets-Sheet 2
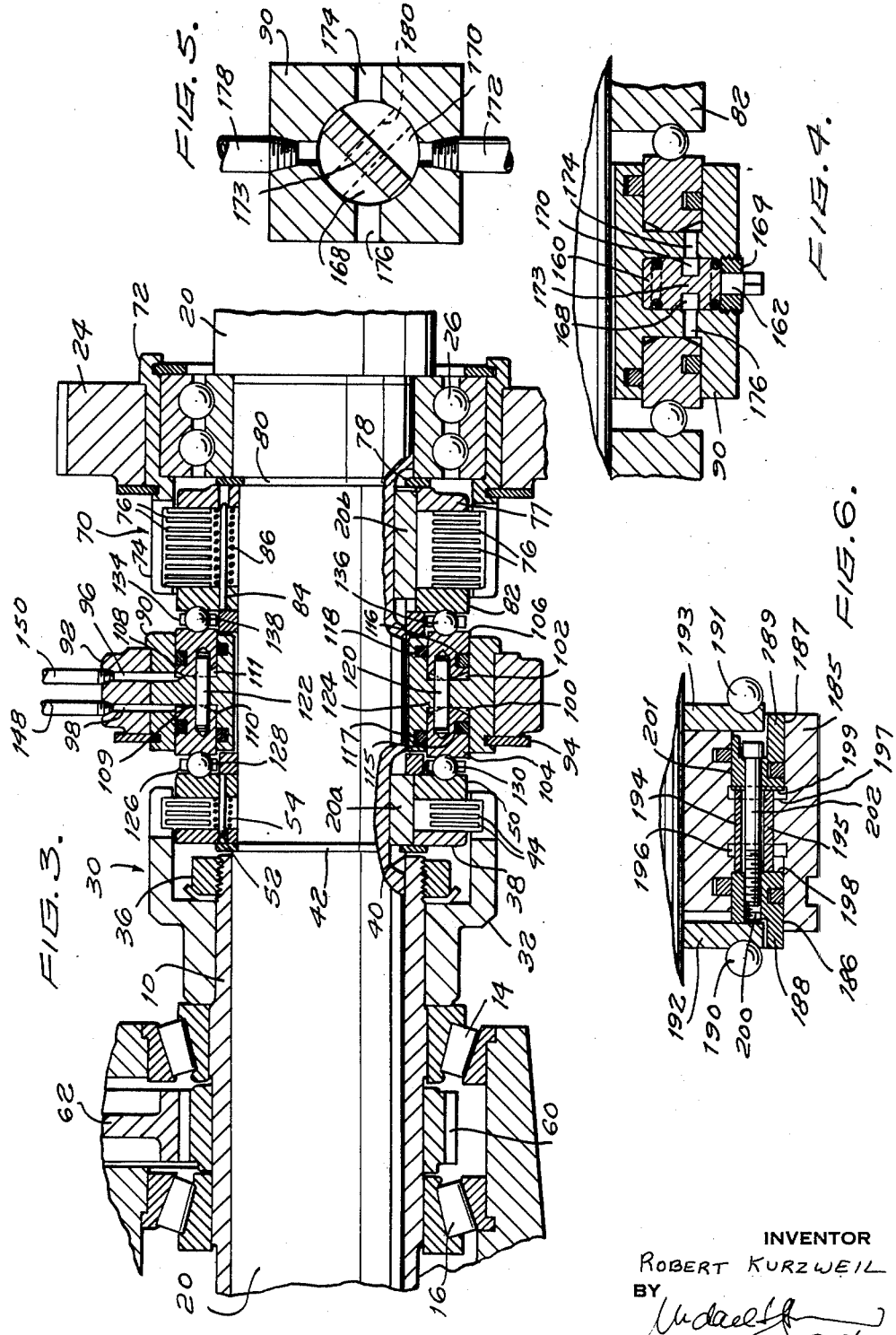
INVENTOR
ROBERT KURZWEIL
BY

United States Patent Office 2,701,042
Patented Feb. 1, 1955

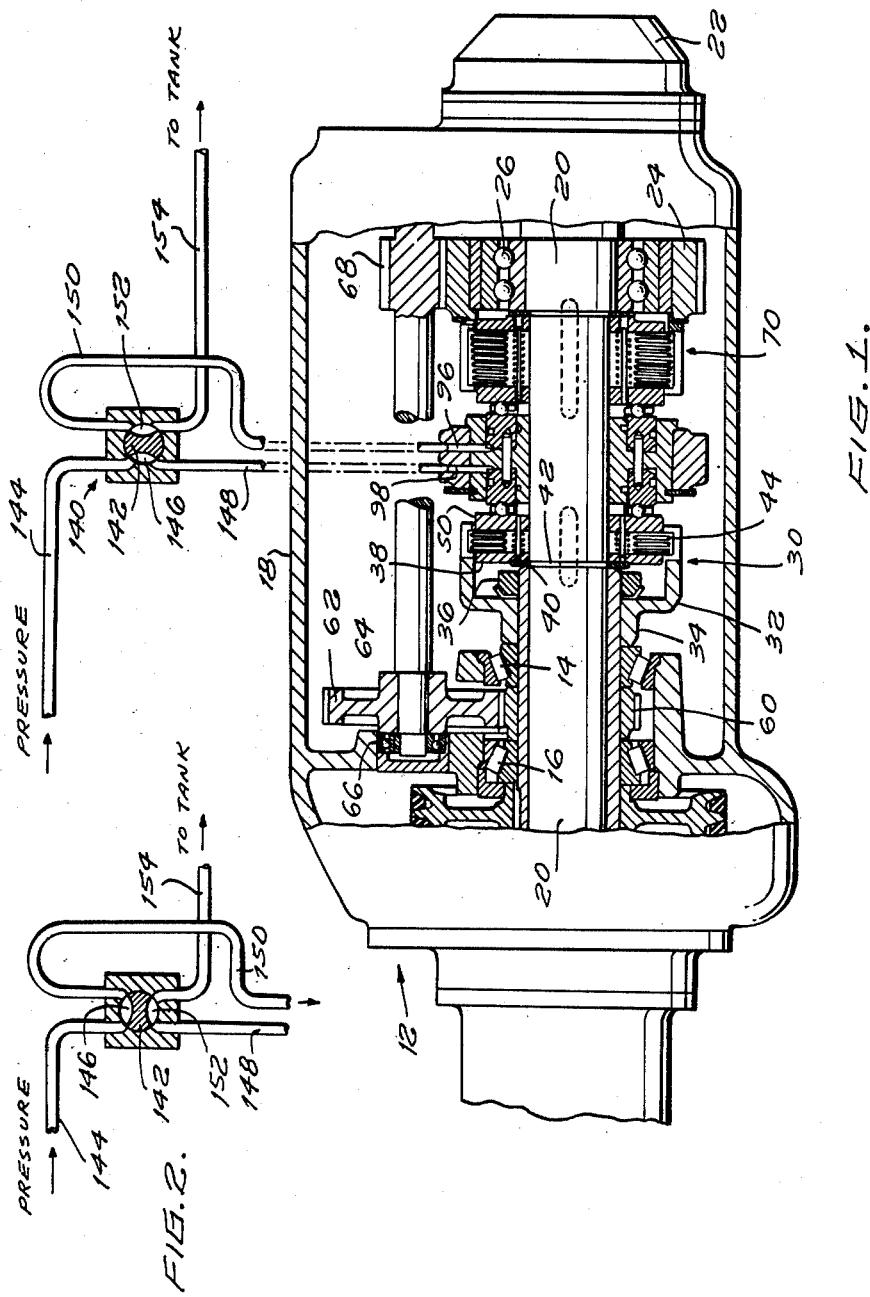

2,701,042

CLUTCH FOR A POWER TRANSMISSION MECHANISM

Robert Kurzweil, Kew Gardens, N. Y., assignor to Morey Machine Co., Inc., Long Island City, N. Y.

Application May 15, 1948, Serial No. 27,292

1 Claim. (Cl. 192—87)

My present invention relates to power transmission mechanisms.

It is an object of my present invention to provide power transmission mechanisms which are easy to operate and simple in construction.

It is a further object of my present invention to provide power transmission mechanisms in which the driving and driven power elements may be selectively clutched in one of a plurality of operative relationships with a maximum of facility and reliability.

A further object of my present invention is to provide a power transmission mechanism capable of reliable operation over a long period of time with a minimum of maintenance requirements.

Still another object of my present invention is to provide a fluid pressure operated control mechanism which may be advantageously employed in various devices, such as clutches, brakes, combined clutches and brakes, and similar applications.

With the above objects in view, my present invention mainly consists of a power transmission mechanism comprising in combination a spindle, a first clutch unit disposed around the spindle, a second clutch unit disposed also around the spindle spaced from the first clutch unit, a stationary control member disposed also around the spindle between the clutch units and having two outwardly directed opposite faces each facing one of the clutch units, a first outwardly directed annular recess in one of the outwardly directed opposite faces of the stationary control member facing the first clutch unit, a second outwardly facing annular recess in the other of the outwardly directed opposite faces of the stationary control member facing the second clutch unit, a first clutch shifter ring mounted in the first outwardly directed annular recess of the stationary control member slidably in axial direction of the spindle toward and away from the first clutch unit, a second clutch shifter ring mounted in the second outwardly directed annular recess of the stationary control member slidably in axial direction of the spindle toward and away from the second clutch unit, and means for operatively connecting the first or the second outwardly directed annular recess to a source of fluid under pressure.

In accordance with a preferred embodiment of my present invention, the means for operatively connecting the annular recesses to a source of fluid under pressure include first conduit means leading to the bottom of the first annular recess behind the first clutch shifter ring, separate second conduit means leading to the bottom of the second annular recess behind the second clutch shifter ring, and combined valve means for admitting fluid under pressure to one or the other of these conduit means.

In order to properly operate the clutch units, I have found it advisable to provide a first ball thrust bearing arranged between the first clutch shifter ring and the first clutch unit, and a second ball thrust bearing arranged between the second clutch shifter ring and the second clutch unit.

In arrangements of the type proposed by me, it is advisable to provide also guiding means mounted on the stationary control member engaging both clutch shifter rings so as to prevent their rotation while permitting sliding of the shifter rings in axial direction of the spindle toward and away from the corresponding clutch units.

In a particularly preferred embodiment of my new power transmission mechanism, I have found it advisable to connect the two clutch shifter rings firmly to each other at a predetermined constant distance so as to automatically disengage one of the clutch shifter rings from the corresponding clutch unit when the other clutch shifter ring is pressed against the other clutch unit. For connecting the two rings in the above described manner, I preferably provide a plurality of holes passing through the stationary control member so as to connect the recesses within the same, a plurality of spacing sleeves passing through these holes slidably in longitudinal direction and each having a length being slightly greater than the distance between the bottom faces of the recesses and, a plurality of connecting members, e. g. connecting bolts passing through these spacing sleeves and firmly secured at their ends to the shifter rings so as to firmly connect the same spaced at proper distance slidably together in direction of the spindle axis but not turnably about the same.

The novel features which I consider as characteristic for my invention are set forth in particular in the appended claim. The invention itself, however, both as to its construction and its method of operation, together with additional objects and advantages thereof, will be best understood from the following description of specific embodiments when read in connection with the accompanying drawings, in which:

Fig. 1 shows a lathe headstock with its gear casing broken away to disclose, in vertical longitudinal section, the illustrative power transmission mechanism embodying my present invention, and showing the control valve diagrammatically;

Fig. 2 is a detail view showing an embodiment of the hydraulic control valve in transverse section;

Fig. 3 is a longitudinal section of the illustrative mechanism on an enlarged scale, for the purpose of greater simplicity and clarity of disclosure;

Fig. 4 is a detail view showing, in vertical section, a modified shifting mechanism;

Fig. 5 is a detail view showing, in transverse section, a modified control valve construction; and Fig. 6 is a detail view showing, in vertical section, still another modified shifting mechanism.

As shown in Fig. 1 of the drawings, the driving element of the illustrative mechanism is the hollow sleeve 10 within a lathe headstock indicated in its entirety at 12. This sleeve is rotatably mounted by the roller bearings 14 and 16 in appropriately formed parts of the headstock casing 18, and the sleeve 10 is rotated by a pulley keyed thereto and turned by V-belts, as is clearly shown at the left portion of Fig. 1.

The driven element 20 is the hollow shaft or lathe spindle which has fixed thereto the lathe chuck 22. The spindle is appropriately rotatably mounted by means of bearings in the headstock, and a driven gear 24 is rotatably mounted on the spindle by the double row ball bearing 26. The spindle 20 extends through the driving sleeve 10 and is freely rotatable therein.

The driving sleeve 10 can be directly coupled with the spindle 20 by a hydraulic connector clutch unit generally indicated at 30. This unit is shown as a multiple plate friction clutch having the driving element 32 fixed at the right hand end of the sleeve 10. This element is of cup-shaped construction and its hub 34 preferably has a fixed connection with the sleeve. It is held in position by the nut 36 screwed to one end of the sleeve.

The driven element 38 of the clutch is keyed to the lathe spindle, and held thereon by a split ring 40 normally seated within a circular groove 42 in the spindle. The clutch further involves a plurality of friction rings or plates indicated at 44. Alternate plates are keyed to the driving clutch member 32 and the remaining plates are non-rotatably but slidably connected to the driven member 38. The clutch also includes the slidable pressure ring 50 carrying a plurality of pins 52 upon which the compression springs 54 are mounted. These springs normally urge the ring 50 to the left to relieve the pressure on the friction plates to cause the clutch to become inoperative when the ring 50 is free to slide to the right. The clutch operating mechanism by which the ring 50 is held in its operative position will be later described. Members 38 and 50 are keyed to spindle 20 as by key 20a.

To provide a low speed drive for the lathe spindle 20, the driving sleeve 10 has a pinion 60 fixed thereon at a position between the bearings 16 and 14, and this pinion meshes with a gear 62 fixed to a countershaft 64. The latter is journalled in the headstock casing by ball bearings, one of which is shown at 66, and at its right hand end (Fig. 1), the countershaft carries an integral pinion 68 in mesh with the spindle mounted gear 24.

When the first connector unit 30 is inoperative, the lathe spindle 20 may be driven at lower speed through the countershaft and its associated power elements. The latter include a second connector unit 70 shown as a multiple plate clutch similar to that previously described and arranged to selectively afford direct operative connection between the gear 24 and the spindle 20.

As more specifically shown in Fig. 3, the connector unit 70 includes the driven member 72 non-rotatably fixed to the gear 24 and having an inward extension 74 in which the clutch plates 76 are disposed, with alternate plates slidably but non-rotatably mounted relative to the extension. The intervening clutch plates are non-rotatably but slidably mounted relative to the spindle 20 and the remainder of the driven element assembly of the clutch. This assembly includes the ring 77 held in position on the spindle by the split contraction ring 78 which is normally seated in the annular groove 80 in the spindle. The driven element assembly of the clutch also includes the slidable pressure ring 82 carrying a plurality of spring supporting pins 84. The springs 86 are under compression so that the clutch will automatically become inoperative when the pressure ring 82 is free to move under the influence of the springs. As shown, each spring is compressed between the pressure ring 82 and the fixed ring 77. Rings 77 and 82 are keyed to spindle 20 by key 20b.

From the above description it will be seen that when the clutch pressure ring 50 is moved to the left, the lathe spindle is subject to direct drive at high speed, and when the ring 50 is not so moved, the spindle may be driven at low speed through the countershaft and its associated gearing. To initiate this low speed drive, the second connector unit, or clutch, is rendered operative by the shifting of the pressure rings 82 to the right. Such selective operation is accomplished through the action of a fluid pressure operated clutch control system now to be described.

The clutch control system includes an annular fixed control member 90 disposed around the spindle 20 at a position between the clutches, as clearly shown in Fig. 3. It is fixed within an opening in the member or members 92, rigid with the lathe gear casing. Preferably, a contractible split ring 94 secures these members in their operative relationship.

Radially disposed fluid pressure ducts 96 and 98 lead through both of the members 90 and 92 to opposite annular recesses 100 and 102 in the member 90. Slidably fitted within the recess 100 is a clutch shifter piston or ring 104 adapted to slide axially therein, and a similar shifter piston or ring 106 is similarly mounted within the recess 102.

The inner annular surfaces of the shifter rings are bevelled as indicated at 108—111, the bevelled surfaces 108 and 109 providing fluid pressure chambers in communication with the ducts 96 and 98, respectively, when the shifter rings are at their extreme positions toward the bottoms of the recesses 100 and 102.

In the operation of the clutch operating system, one or the other of the shifter rings is subjected to fluid pressure through one of the ducts 96 or 98 to move it axially within its recess, and leakage of fluid from the pertinent recess (100 or 102) is minimized or prevented by the sealing rings 117, 118 which are seated within annular recesses in the member 90 with their outer circumferential surfaces bearing on adjacent surfaces of the shifter rings 104 and 106.

Sealing rings 115, 116 are disposed in grooves in the piston rings 104 and 106 and their outer circumferential surfaces engage inner surfaces of grooves 100, 102, respectively.

The shifter rings 104 and 106 are guided in their operative movements by pins 120 and 122 which are rigidly or slidably disposed within openings in the web 124 of the body 90 and have their opposite ends respectively slidably or fixedly seated within sockets formed in the inner annular portions of the shifter rings.

Between the pressure ring 50 and the shifter ring 104 is a thrust bearing including a spacer ring 126 for a circumferential series of balls such as 128 and 130. The latter transmit the thrust of the shifter ring 104 to the pressure ring 50 to engage the elements of the clutch 30. This occurs when fluid under pressure flows through the duct 98 to the chamber 100. Similarly, at the opposite side of the control member 90, a thrust bearing is disposed between the shifter ring 106 and the clutch pressure ring 82. It includes the spacer ring 134 and the balls 136 and 138, the latter transmitting thrusts to the other ring 82, when fluid under pressure is passed to duct 96.

Fig. 1 shows a valve body 140 housing a two-way valve 142 which is shown as permitting fluid flow from a pressure source, through the tube 144, the valve recess 146, and the tube 148 to the duct 98 to operate the clutch 30 and provide for direct drive from the drive sleeve 10 to the lathe spindle 20. Simultaneously, the duct 96 is connected for exhaust fluid flow through tube 150, valve recess 152 and tube 154 to an exhaust tank or other chamber.

Fig. 2 shows the valve body turned 90° from its Fig. 1 position to provide for the operative engagement of clutch 70 and the reverse of the operation above described.

Fig. 4 shows a modification wherein the valve body 160 is mounted directly within a recess in the control body 90. Integral with the body 160 is a valve stem 162 which extends through a threaded plug 164 which is removable to permit assembly or repair of the valve. A larger opening may also be provided in the body member 92 to provide for access to the valve. In this case, the cost of manufacture is reduced by the straight web construction 173 between the valve recesses 168 and 170. This construction is indicated in Fig. 5 which shows the valve and its web so turned as to provide for the engagement of the clutch 70 by the flow of fluid under pressure through the tube 172, valve chamber 170, and duct 174, leading directly to the pressure chamber 102 behind the pressure ring 106. Simultaneously, the exhaust flow is from chamber 100, through duct 176, valve recess 168, and then through tube 178 to an exhaust tank. The dotted line position 180 of the web 173 indicates the position of the valve for reverse operation of the clutches.

Fig. 6 shows a modified shifting mechanism for simultaneously shifting the two clutch shifter rings.

As clearly shown in this figure, the stationary control member 185 is provided with two outwardly facing annular recesses 186 and 187 in which recesses the two clutch shifter rings 188 and 189, respectively, are arranged. In this embodiment of my invention, the clutch shifter rings do not contact directly the bearing balls 190 and 191, but a pressure ring 192 is interposed between the outer face of the clutch shifter ring 188 and the corresponding bearing balls 190, and another pressure ring 193 is interposed between the outer face of the clutch shifter ring 189 and the corresponding bearing balls 191.

In order to properly space the shifter rings 188 and 189, I provide several holes in the stationary control member, one of which is shown in Fig. 6 and designated with reference numeral 194. Through the holes pass the spacing sleeves 195 which, as clearly shown, are slightly longer than the distance between the bottom faces 196 and 197 of the recesses 186 and 187. These spacing sleeves abut with their end faces against the bottom faces 198 and 199 of the shifter rings 188 and 189, keeping them at a proper distance.

The shifter rings 188 and 189 are provided with holes corresponding to the spacer sleeves 195, namely, the shifter ring 188 is provided with screw threaded holes 200, and the shifter ring 189 is provided with corresponding unthreaded holes 201. Through these holes and the spacing sleeves 195 pass the bolts 202 firmly screwed into the screw threaded holes 200 in the shifter ring 188. In this manner, the two shifter rings are firmly connected with each other, forcing the shifter ring 189 to move out of contact with the pressure ring 193 when the shifter ring 188 is pressed against the pressure ring 192, and forcing the shifter ring 188 to move out of contact with the pressure ring 192 when the shifter ring 189 is pressed against the pressure ring 193.

In the operation of the illustrative mechanism there is no radial load on the thrust bearings, and the load distributed on each thrust bearing is uniformly distributed. These are conditions which promote ease of operation and long life. The fact that the fixed annular member, or cylinder 90 is employed between the clutches, inherently provides for a rugged construction and promotes trouble-free operation.

It will be understood that the coupling operating mechanism includes a fixed cylinder in ring form built around a shaft so that the hydraulic medium does not have to be passed through the inside of the shaft but is entirely externally located.

Furthermore, the thrust bearings permit only straight line thrust to be applied, and such thrust is applied uniformly all around, and eliminates radial load.

It will be understood that a straight in-line construction is provided. The construction furthermore may be applied to either a brake or clutch or other coupling means.

It will be furthermore noted that in the event of leakage through the annular grooves, the hydraulic medium will only serve to lubricate the parts so that such leakage has a useful purpose.

It will be understood that each of the elements described above, or two or more together, may also find a useful application in other types of power transmission mechanisms, differing from the types described above.

While I have illustrated and described the invention as embodied in power transmission mechanisms equipped with two clutch units, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claim.

What I claim as new and desire to secure by Letters Patent is:

A power transmission mechanism comprising, in combination, a hollow rotatably mounted driving spindle; turning means operatively connected to said driving spindle for rotating the latter; a solid rotatably mounted driven spindle located within said driving spindle and extending beyond the same; a first clutch unit mounted on said driven spindle and having two members one of which is rigidly connected to said driving spindle and the other of which is non-rotatably mounted on said driven spindle; a second clutch unit mounted on said driven spindle and spaced from said first clutch unit, said second clutch unit having two members one of which is connected by gearing to said driving spindle to be rotated thereby at a different speed than said driving spindle and the other of which is non-rotatably mounted on said driven spindle; a first ring member slidably but non-rotatably mounted on said driven spindle, said first ring member being associated with said first clutch unit and having an outer side surface formed with an annular groove and facing said second clutch unit; first clutch plate means operatively connected to said two members of said first clutch unit for transmitting a drive from said driving spindle to said driven spindle; a second ring member slidably but non-rotatably mounted on said driven spindle, said second ring member being associated with said second clutch unit and having an outer side surface formed with an annular groove and facing said first clutch unit; second clutch plate means operatively connected to said two members of said second clutch unit for transmitting a drive from said driving spindle to said driven spindle; a first thrust bearing means mounted against said first clutch unit and comprising a plurality of spaced spherical members mounted in said annular groove of said first ring member; and a second thrust bearing means mounted against said second clutch unit and comprising a plurality of spaced spherical members mounted in said annular groove of said second ring member, whereby, when said first thrust bearing means and first ring member therewith are moved away from said second clutch unit, said first clutch unit transmits a drive from said driving spindle to said driven spindle, and, when said second thrust bearing means and said second ring member therewith are moved away from said first clutch unit, said second clutch unit transmits a drive from said driving spindle to said driven spindle.

References Cited in the file of this patent

UNITED STATES PATENTS

| Number | Name | Date |
|---|---|---|
| 794,899 | Sturtevant | July 18, 1905 |
| 918,652 | Bryan | Apr. 20, 1909 |
| 2,055,970 | Fippard | Sept. 29, 1936 |
| 2,257,364 | Bakewell | Sept. 30, 1941 |
| 2,375,440 | Roche | May 8, 1945 |
| 2,464,538 | Vanderzee | Mar. 15, 1949 |
| 2,485,805 | Bent | Oct. 25, 1949 |

FOREIGN PATENTS

| Number | Country | Date |
|---|---|---|
| 644,013 | Germany | Jan. 6, 1935 |